March 31, 1959     A. F. SEIBEL     2,879,948
FUEL AND GASEOUS MIXING UNIT
Filed April 18, 1956
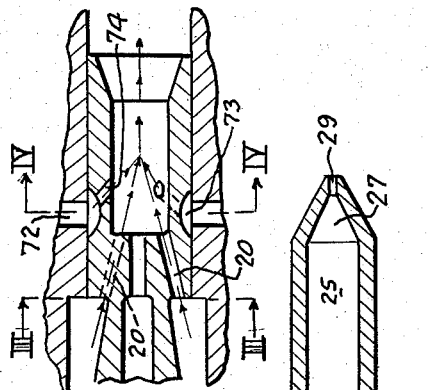
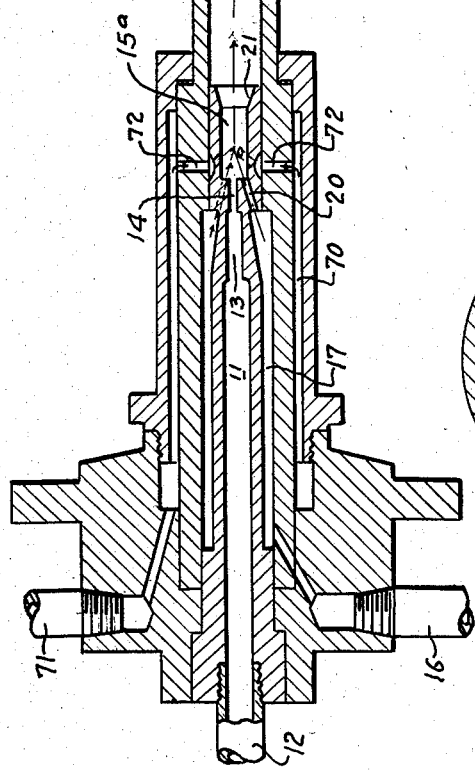
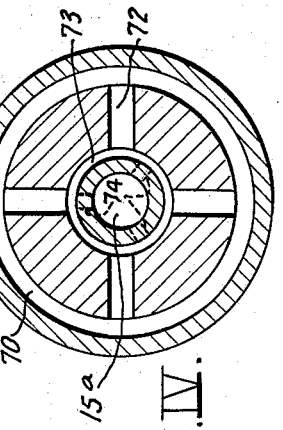
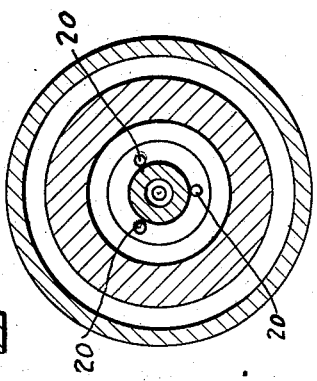
INVENTOR.
Alfred F. Seibel
BY
Edmund B Whitcomb
ATTORNEY United States Patent Office 2,879,948
Patented Mar. 31, 1959

2,879,948

FUEL AND GASEOUS MIXING UNIT

Alfred F. Seibel, Toledo, Ohio

Application April 18, 1956, Serial No. 578,979

4 Claims. (Cl. 239—427)

This application is a continuation in part of my prior application Serial Number 393,633 filed November 23, 1953, for Vaporizing and Mixing Unit, now Patent 2,764,455.

This invention relates to certain specific embodiments of the fuel and gaseous mixing unit disclosed in my prior case, or special arrangements in which a liquid fuel such as oil, for example, is mixed with one or more gaseous fluids such as compressed air, steam or other gases comprising specially constructed mixing, vaporizing, expansion and turbulizing chambers and compression means as to produce a highly satisfactory combustible mixture.

Further objects and advantages are within the scope of this invention such as relate to the arrangement, operation and function of the related elements of the structure, to various details of construction and to combinations of parts, elements per se, and to economics of manufacture and numerous other features as will be apparent from a consideration of the specification and drawing of a form of the invention, which may be preferred, in which:

Figure I is a sectional elevation of a burner in which a construction is provided wherein an additional compressed gas in introduced into the mixing chamber of the type illustrated in my prior patent.

Figure II is an enlarged section of the mixing chamber of Figure I.

Figures III and IV are sectional views taken on lines III—III and IV—IV of Figure II.

Reference is hereby made to the disclosures including the drawings of my prior patent application, now Patent No. 2,746,455, with which the present case was copending, and in Figure I, hereof. I show a vaporizing member, the oil or other liquid fuel supply to which is admitted under pressure to a central cylindrical passage 11 from a supply line 12.

The discharge end of the passage 11 is reduced in diameter to form a passage 13 and terminates in a still further restricted outlet 14 adapted to discharge a fine stream of liquid fuel to be united with air, steam or other gas in a mixing or "first stage" treatment chamber 15a.

Air or other suitable gas, steam, or the like, under pressure, for example, 45 to 50 pounds per square inch, is admitted from a source 16 through an annular chamber 17, surrounding the wall 18 of the passage 11 and discharges into chamber 15a. The annular passage 17 is closed except for a plurality of ports 20 inclined at a suitable angle, preferably substantially at such an exact angle as to converge in the line of the axis of the passage 11 or into the center of the stream of liquid fuel issuing from the outlet 14. The arrangement and inclination of these ports 20 is such that the impingement of the air on the fuel stream takes place slightly forward of the center of the mixing chamber 15a, the oil and gas extremely divided up, vaporized and interunited as will hereinafter appear. Moreover, it will be noted from the drawing, as noted in Figure III that I prefer to use three ducts, spaced 120 degrees circumferentially around the axis of the unit since I have found that by using an odd number of ducts, as shown, the meeting of the stream of compressed gaseous fluid centrally of the axis of the unit has a very desirable effect in furthering the mixture, since there is no tendency of the contact of one of the streams to counterbalance the other but the gases and fuel are the more intimately mixed when an odd number of compressed gaseous fluid ducts are employed. The chamber 15a has an outwardly flared wall 21 and the proportions of the mechanism herein illustrated I have found to be very satisfactory in operation.

An important addition in the present invention over the prior patent consists of the provision of a further annular chamber 70 supplied by pipe 71 for injecting a compressed additional gas or fluid (which may be different from the fluid introduced through passages 20) into the mixing chamber 15a. To do this, I provide four radial passages 72 (see Figures II and IV) leading into an annular groove 73 in the outer wall of the mixing chamber 15a shown enlarged in Figure II. From this annulus 73, I provide a series of three angularly disposed passages 74 circumferentially staggered with respect to the other diagonal passages 20 to direct the gas into substantially the exact meeting point of location of the mixing chamber where the first set of passages 20 direct the compressed gas into the fuel. This second additional compressed gas or fluid may be of a nature to reduce oxidation of the metal or reduce scale when the burner is used in drop-forge furnaces.

Upon issuing from the flared outlet 21 of the mixing chamber 15a, the mixture in this embodiment enters the expanding chamber 25 similar to the action of the other embodiments. Here the mixture expands and is turbulized intimately mixed and vaporized therein until it is recompressed in the chamber 27 from which it issues through the outlet 29.

It is apparent that, within the scope of the invention, modifications and different arrangements may be made other than is herein disclosed, and the present disclosure is illustrative merely, the invention comprehending all variations thereof.

What I claim is:

1. In a fuel and gaseous fluid vaporizer unit for a furnace, a central passage having a fuel inlet at one end and an outlet at the other end; an annular gaseous fluid passage surrounding said central passage having means to admit a gaseous fluid thereto at the end thereof adjacent the inlet of said central passage; a relatively short longitudinally extended mixing and expanding chamber fixed to the outlet end of said central passage, said chamber being provided with a plurality of annularly arranged diagonal gaseous fluid ducts from said surrounding passage into said mixing chamber, said diagonal ducts arranged to direct said gaseous fluid to converge in a point in said mixing chamber; and a relatively long enlarged expansion chamber fixed to the outer end of said mixing chamber; another annular passage surrounding said first-mentioned annular gaseous fluid passage connected at one end with an inlet and provided at its other end with diagonally arranged ducts for connecting said second annular passage with the interior of said mixing chamber and arranged to direct additional gaseous fluid streams into the mixing chamber before passing into said expansion chamber, said expansion chamber forming an expansion section for extremely finely atomizing and turbulizing the mixture; a restricting wall at the outer end of said expansion section forming a compression chamber at the emerging end of said extension, said compression chamber having an outlet for the combustible mixture.

2. In a fuel and gaseous fluid vaporizer unit for a furnace, a central passage having a fuel inlet at one end and an outlet at the other end; an annular gaseous fluid passage surrounding said central passage having means to admit a gaseous fluid thereto at the end thereof adjacent the inlet of said central passage; a relatively short longitudinally extended mixing and expanding chamber fixed to the outlet end of said central passage and connecting therewith, said chamber being provided with a plurality of annularly arranged diagonal gaseous fluid ducts from said surrounding passage into said mixing chamber, said diagonal ducts being equally spaced circumferentially of said unit and arranged to direct said gaseous fluid to converge in a point in said mixing chamber; and a relatively long enlarged expansion chamber fixed to the outer end of said mixing chamber; another annular passage surrounding said first-mentioned annular gaseous fluid passage connected at one end with an inlet and provided at its other end with means to communicate with said mixing chamber and arranged to direct additional gaseous fluid streams into the mixing chamber before passing into said expansion chamber, the construction including diagonally arranged ducts equally spaced circumferentially of said unit and staggered with respect to said first mentioned diagonal ducts, said expansion chamber forming a section for extremely finely atomizing and turbulizing the mixture; a restricting wall at the outer end of said expansion chamber forming a compression chamber at the emerging end of said compression chamber having an outlet for the combustible mixture.

3. In a fuel and gaseous fluid vaporizer unit for a furnace, a central passage having a fuel inlet at one end and an outlet at the other end; an annular gaseous fluid passage surrounding said central passage having means to admit a gaseous fluid thereto at the end thereof adjacent the inlet of said central passage; a relatively short longitudinally extended mixing and expanding chamber fixed to the outlet end of said central passage, said chamber being provided with a plurality of annularly arranged diagonal gaseous fluid ducts from said surrounding passage into said mixing chamber, said diagonal ducts arranged to direct said gaseous fluid to converge in a point in said mixing chamber; and a relatively long enlarged expansion chamber fixed to the outer end of said mixing chamber; another annular passage surrounding said first-mentioned annular gaseous fluid passage connected at one end with an inlet and provided at its other end with diagonally arranged ducts for connecting said second annular passage with the interior of said mixing chamber and arranged to direct additional gaseous fluid streams into the mixing chamber before passing into said expansion chamber, said extension forming an expansion section for extremely finely atomizing and turbulizing the mixture; a restricting wall at the outer end of said expansion section forming a compression chamber at the emerging end of said expansion chamber, said compression chamber having an outlet for the combustible mixture; said compression chamber being unobstructedly connected with said expansion section to uniformly condense said turburlized mixture for delivery to said outlet.

4. In a fuel and gaseous fluid vaporizer unit for a furnace, a central passage having a fuel inlet at one end and an outlet at the other end; an annular gaseous fluid passage surrounding said central passage having means to admit a gaseous fluid thereto at the end thereof adjacent the inlet of said central passage; a relatively short longitudinally extended mixing and expanding chamber fixed to the outlet end of said central passage, said chamber being provided with a plurality of annularly arranged diagonal gaseous fluid ducts from said surrounding passage into said mixing chamber, said diagonal ducts arranged to direct said gaseous fluid to converge in a point in said mixing chamber; and a relatively long enlarged extension fixed to the outer end of said mixing chamber; another annular passage surrounding said first-mentioned annular gaseous fluid passage connected at one end with an inlet and provided at its other end with diagonally arranged ducts for connecting said second annular passage with the interior of said mixing chamber and arranged to direct additional gaseous fluid streams into the mixing chamber before passing into said expansion chamber, said expansion chamber forming an expansion section for extremely finely atomizing and turbulizing the mixture; the volume of said expansion section being several times greater than the volume of said mixing chamber; a restricting wall at the outer end of said expansion section forming a compression chamber at the emerging end of said extension, said compression chamber having an outlet for the combustible mixture.

References Cited in the file of this patent

UNITED STATES PATENTS 2,764,455     Seibel _____ Sept. 25, 1956